Patented Nov. 24, 1925.

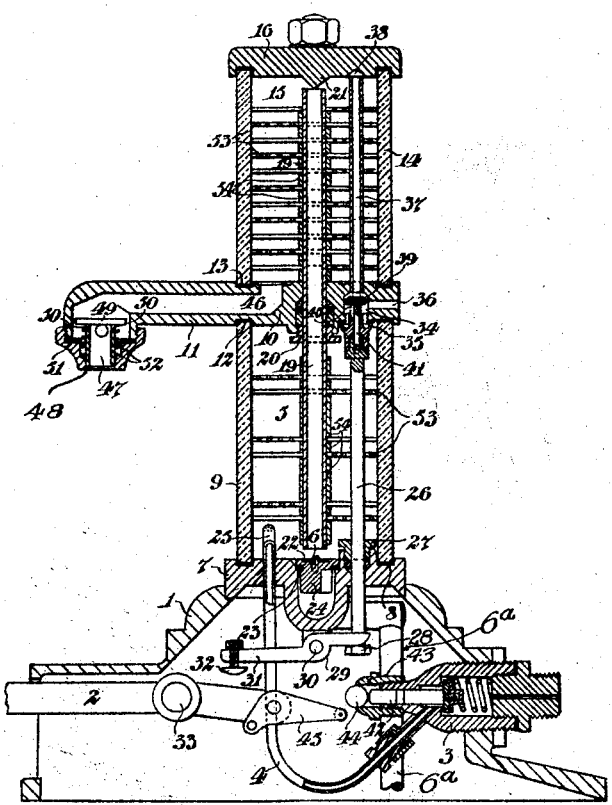

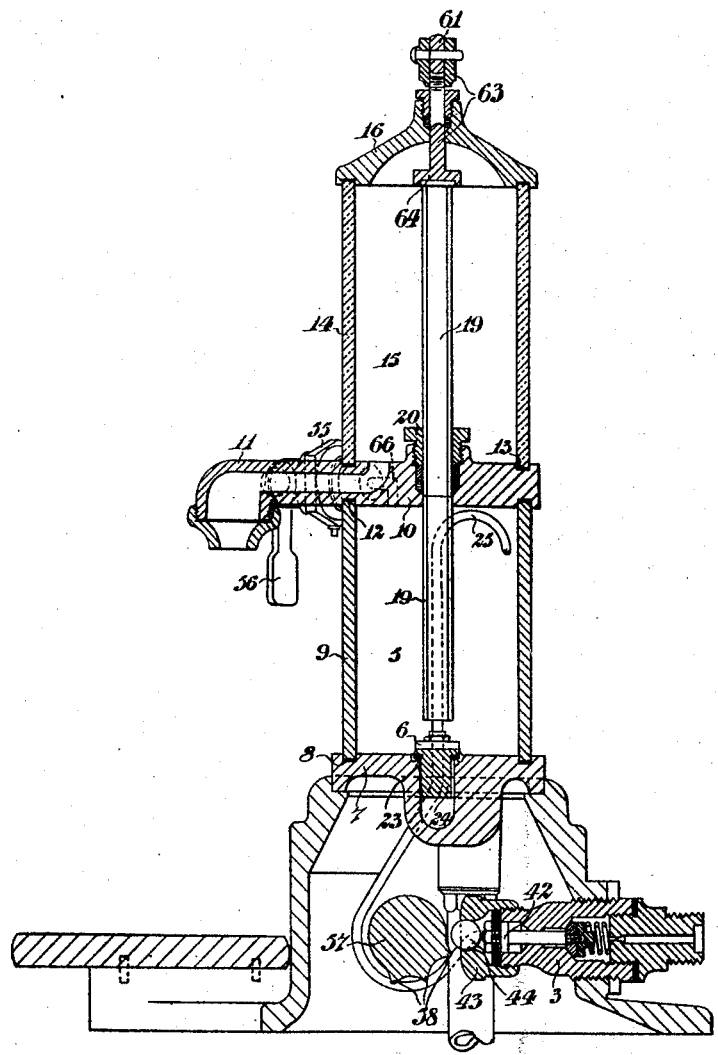

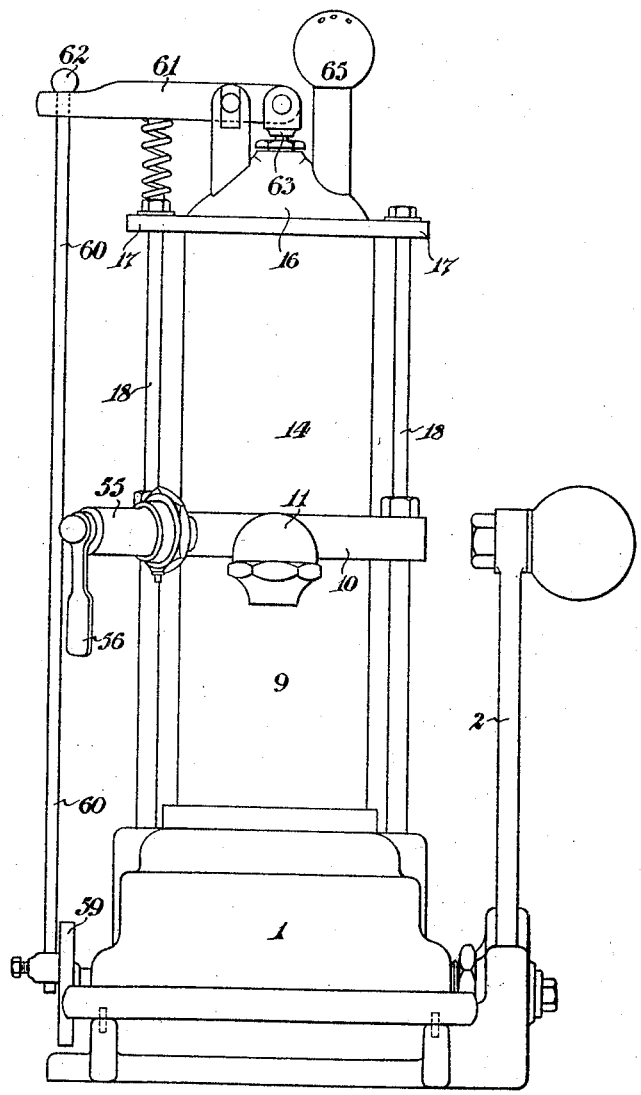

1,562,628

UNITED STATES PATENT OFFICE.

PERCIVAL ALBION GARRETT, OF GOODMAYES, ENGLAND.

APPARATUS FOR AERATING LIQUIDS AND THE LIKE.

Application filed December 2, 1922, Serial No. 604,633. Renewed October 6, 1925.

*To all whom it may concern:*

Be it known that I, PERCIVAL ALBION GARRETT, a subject of the King of Great Britain and Ireland, and a resident of Goodmayes, county of Essex, England, have invented a certain new and useful Improvement in Apparatus for Aerating Liquids and the like, of which the following is a specification.

This invention has reference to gazogenes and similar apparatus in general for aerating, carbonating or gasifying liquids which are of compact form suitable for shop counters.

Machines of this nature generally include an aerating chamber having a snift valve to put said chamber in communication with atmosphere, a liquid valve, a valve-controlled gas inlet, and a valve governing the discharge of aerated liquid.

According to the said invention the liquid inflow valve to the aerating chamber is held closed merely by the air cushion in the aerating chamber and release of said cushion by snifting automatically opens said liquid valve without mechanical operation thereof. A prior proposal employed gas pressure to keep the liquid inflow valve seated, and snifting of the gas released the valve, but in the present invention, liquid can be admitted to the aerating chamber, and cut off at any point by the atmospheric valve, quite irrespective of gas admittance which can take place during, at the end of, or any time after, the liquid inflow. Further, although I may adopt the common expedient of the baffles in the aerating chamber, they are not essential, because, by admitting the gas in a short sharp charge or series of intermittent charges direct to the liquid without recourse to a regulator (or other pressure reducing appliance between gas cylinder and aerating chamber) as is usual, I obtain the thorough aeration necessary. To permit of this effect and to enable me to use pressures considerably over the customary 100 lbs. or thereabouts (even up to 250 to 300 lbs. direct from the cylinder), I construct the aforesaid atmospheric snift valve so that it can also act automatically under excess pressure, thereby serving as a safety valve. The aerating chamber has a valve-controlled passage leading to the delivery chamber.

The preferable construction I adopt includes a partition or plate surmounting the aerating chamber which partition carries a delivery chamber either superimposed thereon or attached thereto which may be of very small dimensions as will hereinafter appear. Said partition also contains the snift valve aforesaid, and two embodiments of the invention in accordance with such construction will be described.

To render clear an understanding of the following description, some drawings are hereto appended illustrating the present invention, and in said drawings:—

Figure 1 is a sectional elevation.

Figure 2 is a similar view of a modified form; and,

Figure 3 is an exterior elevation of the construction according to Figure 2, although so far as the main construction of cylindrical chambers, dividing member, base, tie-rods and so forth is concerned, it may be taken as denoting the exterior structure of the Figure 1 form.

Wherever possible, like numerals of reference are used to designate the same or corresponding parts in the several views.

Referring to the construction illustrated in Figure 1, a hollow metallic base 1 is employed which contains extending therefrom the operating lever 2, the gas inlet valve 3 with its communicating pipe 4 to the lower chamber 5 and liquid inlet valve 6 which is supplied by a pipe 6ª together with other elements to be described. On the top of said base 1 is mounted a circular bed-plate 7 containing centrally the liquid inlet valve 6 aforesaid and having a concentric annular recess 8 on its upper face with a packing strip to form a seating for the lower edge of a vertically disposed thick glass, metal, or other cylinder 9 constituting the lower or aerating chamber 5. A dividing partition member 10 carrying the discharge nozzle 11 is positioned on the top of said cylinder 9 by means of an annular recess 12 and packing on its lower face, and the upper face is similarly constructed as at 13 to provide a seating for an upper glass or other cylinder 14 constituting the upper or delivery chamber 15. A head cap 16 surmounts the upper cylinder 14, and is furnished (see Figure 3) with lugs 17 through which vertical tie-bolts 18 pass, extending to the hollow base 1, keeping the parts tightly together in their assembled relation. The two cylindrical chambers 5 and 15 so constructed are entirely independent excepting for a central communicating tube 19 mounted through the dividing partition 10 by a gland and packing 20 and extending to near the top of the upper chamber 15, the head cap 16 preferably having an interior conical pip 21 immediately over the open end of said tube 19. The bottom end of the tube 19 extends to near the hereinbefore mentioned bottom bed-plate 7 and lies immediately over the liquid check valve 6 governing the liquid inlet, said valve having a seating 22 on its upper surface to close the lower opening of the communicating tube 19 when the liquid inlet is open, and having a packing ring 23 on its lower head surface (which is a flange) to take a seating on an annular seat formed around the liquid inlet; the lower part 24 of the check valve is of triangular section or is of any other well-known type, and is consequently a double-acting valve as hereinbefore described, rising to admit liquid and simultaneously closing the communicating tube 19. Projecting through the bed-plate 7 on one side of the liquid inlet 6 is a twin or other gas jet 25 which is the termination of the pipe 4 communicating with the gas valve 3 mounted in or on the hollow base.

Also mounted through the bed-plate 7 preferably diametrically opposite the gas jet 25 is a vertical rod 26 to actuate the atmospheric openings in the dividing member 10 as will appear later. This rod 26 passes through a stuffing box 27 constructed on the bed-plate terminating therebeneath in a threaded extremity carrying a keep and adjusting nut 28 (or nuts) by means of which the said rod 26 is connected to a lever 29 lying substantially horizontally in the hollow base 1 and pivoted in its length to a spindle 30, situated at right angles to its length. The opposite arm 31 of said lever 29 has an adjustable button 32 or other device adapted to be engaged by the operating lever 2 of the apparatus, which, in the form shown, pivots about the bearing 33.

The vertical spindle 26 mentioned in the preceding paragraph extends upwardly the length of the lower chamber 5 to a valve casing or valve chamber 34 on or in the dividing partition 10, and carries, at said chamber, a valve 35 controlling admission of atmospheric air to the lower chamber 5 (inasmuch as the valve chamber 34 now being described is open to atmosphere via a bore 36 therefrom to the outside periphery of the partition 10). From said valve chamber 34 there extends upwardly a tube 37 to the upper or delivery chamber 15 which reaches to the head cap 16 and projects, preferably, into a recess 38 on the exterior of the said cap, there being unimpeded passage for gas from the upper chamber 15 through the said tube 37 to the valve chamber 34 in the partition. The lower opening of the tube 37, in the valve chamber, is controlled by a discharge-control valve or snift valve 39 held up to its closure position by a light spring 40 which surrounds the valve spindle 41, the latter being mounted on the atmospheric valve 35 of the aerating chamber 5. By this arrangement excessive pressure in the apparatus is relieved automatically by the snift valve 39 being pressed back against its spring 40 by gas in the upper chamber 15. The valves 35 and 39 can both be opened by the spindle 26 in the following manner: Spindle 26 directly opens the valve 35 and the stem 41 of the valve 39 has a degree of movement with relation to the valve 35 controlled by slot-and-pin connection whereby after a prearranged travel of the valve 35, the valve 39 is opened. The latter, however, can open automatically by internal pressure against action of the spring 40, its stem sliding in the valve 35, thus placing the upper chamber in communication with atmosphere.

The gas inlet valve 3 in the base of the apparatus is of any suitable type, and is controlled by an inwardly projecting spindle 42 extending into a cap 43 carrying a ball 44 operating on the end of said gas valve spindle 42. Said ball 44 is adapted to be pressed in on the upward movement of a wiper lever 45 pivoted on the main operating lever 2, which wiper lever 45 can freely move past the ball 44 in its downward arcuate travel, but definitely engages it with pressure on its upward movement. The roller on the end of the arm 45 is only in momentary contact with the ball 44, with the result that the gas admittance takes the form of a short sharp charge at the moment of engagement.

In operation, the inner end of the operating lever 2 is elevated past the gas inlet valve 3 and engages the adjustable stud 32 hereinbefore mentioned. This opens both chambers 5 and 15 to atmosphere by means of the vertical spindle 26 aforesaid, and admits liquid by releasing the air cushion in 5 and allowing the twin valve 6 to rise and simultaneously close the communication tube 19. Liquid continues flowing until the desired quantity is admitted, whereupon the inner end of the operating lever 2 is depressed, closing both delivery and aerating chambers to atmosphere and elevated again a requisite distance, so that wiper 45 actuates the valve 3 and admits gas to aerate the admitted liquid, which is forced by the gas pressure into the upper chamber via tube 19. Meanwhile, and before the admission of gas, the previous draught in the upper chamber 15 is discharged in the following manner.

When the draught is transferred to the upper delivery chamber by gas pressure, the chamber has been closed to atmosphere. The discharge nozzle 11 formed with the dividing partition 10, as already stated, communicates through the partition to said upper chamber through the passage 46, and at the nozzle has a trap valve 47 of any suitable construction which is held closed by the gas pressure of the draught in chamber 15 awaiting discharge. Said valve 47 may be in the form of a cylindrical sliding portion 48 and a flanged head 49, there being a number of orifices 50 immediately under the head 49 in the cylindrical portion 48. The head 49 forms a liquid-tight seating on an annular ledge 51 of the nozzle, but is normally pressed away therefrom by a light compression spring 52 between the valve seating 51 and the under-surface of the valve-head 49. To discharge the draught, the snift valve 39 is opened (simultaneously with the admission of a new draught to the lower chamber 5) releasing or easing the gas pressure in said delivery chamber 15, and allowing the trap valve 47 to open under the action of the spring 52. In certain cases, especially where the gas pressure caused by the aerated draught in the chamber 15 is not too great, the draught may be run straight away through the nozzle 11 as and when it is transferred up the tube 19, and the trap valve 47 not used; in such a case the snifting operation is unnecessary and the valve 39 dispensed with.

With the form illustrated, a new draught cannot be transferred to the upper chamber 15 until the liquid inlet 6 to the aerating chamber 5 has been closed, atmospheric valves 35 and 39 closed, and a charge of gas admitted.

Each chamber is or may be provided with a number of agitating plates 53 preferably of glass in the known manner. These are threaded on to the central communicating tube 19 with suitable packing sleeves 54 interposed.

The discharge nozzle 11 may be constructed as a cylindrical barrel or equivalent into which the discharging aerated liquid is led in a tangential direction so that a swirl is set up before the liquid finally discharges through the trap valve; the upper part of said "swirling" chamber has one or more pin-holes, and, during the swirling, gas can escape therethrough to minimize the final force and velocity of exit.

When a glass cylinder is employed at 9 for the lower chamber and/or the cylinder 14 is of glass, either or both may be graduated, or a separate interiorly or exteriorly disposed graduated member employed.

Referring now to Figures 2 and 3, there is illustrated a form wherein the closure of the communicating passage 19 is independent of the valve 6, which embodiment also shows an instance of dispensing with the trap valve 47 shown in Fig. 1 and with the consequential snift valve 39; a slightly modified disposition of operating handle 2 and construction of its parts in the hollow base 1 is illustrated. In this example the valve 6 is single-acting, but although not constructed for the purpose, it serves to divert liquid entering the aerating chamber 5 and to check a rush up the tube 19. A positive closure is effected, however, at the upper end of the tube 19 as will be explained later. As in the previous case—Figure 1—the valve 6 is prevented from rising by the air cushion in chamber 5, and allowed to open by putting such aerating chamber in communication with the atmosphere. The atmospheric valve 35 is replaced by the atmospheric valve 55 operated independently by the lever 56. A method of providing for the interworking of this valve automatically in a cycle of operations will be described later. Said valve 55 is in communication with the aerating chamber 5 through the passageway 66 formed in the dividing chamber or partition 10, and is constructed so that excess pressure in the aerating chamber can automatically open same.

When liquid to a required amount has been admitted to the lower or aerating chamber 5, and the valve 55 closed, partial rotation of the shaft 57 mounted in the base of the apparatus, through the medium of the lever 2 admits gas through the gas valve 3 in one or a number of snifts, the peripheral surface of the shaft 57 being formed with a number of projections 58 acting on the gas valve ball 44 in an instantaneous manner similar to the action of the roller on arm 45 of the previously described construction.

The shaft 57 is furnished with a cam plate 59 on the exterior of the base 1, and whilst the liquid in the chamber 5 is being aerated, an exterior connecting rod 60 is being raised through said cam plate. During this upward movement, the rod 60 slides freely through an aperture in the lever 61 pivoted on the head cap 16. After the first part of aeration, the lever 2 and its shaft 57 are returned to past the normal position finishing the aeration, and pulling down the outer end of the lever 61 by means of the enlarged head 62 on the rod 16. This operates the valve mechanism 63 and the communicating valve 64 is opened. At this stage the draught in the lower chamber is transferred by pressure of the aerating gas, up the tube 19 to the chamber 15, whence it is delivered straight away through the nozzle 11. There may be provided a hollow dome 65 formed with pin-holes wherethrough excess gas can escape in order to minimize the final force and velocity of the discharged draught. When the draught has been transferred to the delivery chamber 15, the handle 2 may be returned to the normal (closing the valve 64) ready for another draught.

In the form illustrated in Figures 2 and 3, there is shown the employment of a metal cylinder 9 and a transparent upper cylinder 14, but either may be of any suitable material. Although baffle plates 53 as in Figure 1 are not illustrated, it is to be understood that the use of this known feature in any suitable form is optional.

In order that the atmospheric valve 55 (governing the admission of liquid through the valve 6) may operate in correct sequence and automatically, it may be constructed to have an interworking arrangement with shaft 57, gas valve 3, and communication valve 64 somewhat as in the example previously described. For instance, the lever 56 of said valve may be slotted to engage a pin fixed on the rod 60. The circumferential disposition of the projections 58 on the shaft 57 would be such that initial rotation of the shaft is allowed prior to gas snifting at valve 3. This initial movement opens the valve 55 (through the pin and slot connection aforesaid) following which when the chamber 5 has been sufficiently filled, the movement of the lever 2 and shaft 57 is reversed, shutting the valve 55, and aerating the draught. Further movement of the lever 2 opens the valve 64 as aforesaid, the draught is transferred, and a further liquid supply admitted to the aerating chamber. The valve 55 may be of any known or suitable form of safety blow-off valve which normally requires the positive operation described but is set to open automatically at a predetermined pressure in the areating chamber. Where the lever 56 is held (as in the interworking arrangement with shaft 57 just described) then the movable valve spindle is constructed free to pass through the said lever 56 directly the predetermined pressure in the aerating chamber overcomes the spring or other means of closing this valve, in the same manner as rod 60 passes through lever 61 as previously described.

It will be seen that in the construction according to Figures 2 and 3, the second or delivery chamber merely serves the purpose of an open transfer through which freely passes the draught after delivery from the communication tube. The cubical capacity of such delivery chamber is therefore of no great consideration and can be reduced to very small dimensions; in fact, when the retention of the previously prepared aerated draught (as with Figure 1) is not desired, the discharge nozzle itself can constitute virtually a "delivery chamber," the communicating passage leading directly to such small capacity chamber. The phrase "two-compartment" therefore should be interpreted in this sense.

I claim:—

1. An apparatus for aerating liquids and the like of the type set forth, including a cylinder, a partition member dividing the cylinder into aerating and delivery chambers, a liquid in-flow valve for said aerating chamber, a snift valve for said aerating chamber which controls the liquid in-flow valve by holding and releasing an air cushion in the aerating chamber, a gas valve to said chamber, means to actuate said valve to deliver a short sharp charge directly to the liquid in the chamber, the said snift valve being constructed to automatically open under excessive pressures, and a valve-controlled communicating passage leading from said aerating chamber to a delivery chamber.

2. An apparatus for aerating liquids, including a cylinder, a partition member dividing the cylinder into aerating and delivery chambers, a discharge nozzle carried by said partition, a snift valve also carried by said partition, said partition having an out-flow passage adapted to communicate with the delivery chamber and controlled by said snift valve.

3. An apparatus for aerating liquids, including a cylinder, a partition dividing the cylinder into aerating and delivery chambers, a tube carried by said partition and establishing communication between said chambers, a valve in said aerating chamber adapted to automatically close said tube when liquid is allowed to flow into said aerating chamber and adapted to automatically open said tube during the aeration of the liquid in the aerating chamber.

4. An apparatus for aerating liquids including a cylinder, a partition member dividing the cylinder into aerating and delivery chambers, a discharge nozzle carried by the partition and communicating with the delivery chamber, a valve in said discharge nozzle normally closed by pressure within the delivery chamber, a snift valve in said delivery chamber, and means for operating said snift valve to automatically actuate the valve in the discharge nozzle.

5. An apparatus for aerating liquids including a cylinder, a partition member dividing the cylinder into aerating and delivery chambers, means for establishing communication between said cylinders, a liquid inlet valve controlling said means, a discharge nozzle carried by said partition and communicating with the delivery chamber, an atmospheric passage in said partition adapted to communicate with the aerating and delivery chambers, and snifting valve means associated with said atmospheric passage, common means for controlling said snift valve means whereby the delivery chamber is snifted and consequently emptied simultaneously with or about the same time liquid is admitted to the aerating chamber.

6. An apparatus for aerating liquids including a cylinder, a partition member dividing the cylinder into aerating and delivery chambers, a valved discharge nozzle carried by the partition and communicating with the delivery chamber, snifting valves for said delivery and aerating chambers carried by said partition and the latter having an atmospheric passage controlled by said valves, a tubular member carried by the partition and extending into the aerating and delivery chambers, a liquid inlet valve located in the aerating chamber and adapted to open and close the end of said tubular member within the aerating chamber, means for operating said snift valve, a gas inlet line having a gas jet arranged within the aerating chamber, a valve in said gas inlet line, and common means for successively operating said valve in the gas inlet line and said means controlling the snifting valves.

7. An apparatus for aerating liquids including a base, a cylinder surmounting the base, a partition plate in said cylinder dividing the same into aerating and delivery chambers, a valved discharge nozzle carried by the said partition plate and communicating with the delivery chamber, a tube carried by the partition plate and having its open ends extending toward opposite ends of said aerating and delivery chambers, a liquid inlet valve in the aerating chamber, a liquid inlet in the base normally closed by said valve, and said valve being provided with means for also closing the end of the tube within the aerating chamber when liquid is admitted to said chamber, a gas inlet line carried by the base, a gas discharge jet in the aerating chamber, a gas controlled valve carried by the base, snift valves for said aerating and delivery chambers, and common means for operating said snift valves and gas controlling valve.

8. An apparatus for aerating liquids including a supporting base, a bed plate mounted on the base, a liquid inlet connection for said bed plate, a cylinder surmounting the base and including upper and lower sections, the lower section being mounted on the bed plate, a partition plate arranged between said sections and supporting the upper section of the cylinder, a cap for said upper section, said bed plate, cap, partition plate and cylinder sections cooperating to provide aerating and delivery chambers, a valved discharge nozzle carried by the partition plate, snifting valve means carried by the partition plate, a tube having its open ends located adjacent the cap and bed plate, a valve in the bed plate adapted to control the flow of liquid from said liquid inlet and to also open and close the end of said tube adjacent the bed plate, a valved gas line carried by the base, and common means for successively actuating said gas valve and snifting valves.

9. An apparatus for aerating liquids including a base, a cylinder surmounting said base and formed by upper and lower sections, a partition plate for separating said sections, a bed plate for one of said sections and a cap for the other of said sections, thereby forming liquid aerating and delivery chambers at opposite sides of the partition plate, a tubular member carried by the partition plate for establishing communication between the aerating and liquid chambers, a liquid inlet valve carried by the bed plate and serving to alternately control the liquid inlet of the bed plate and one end of said tube carried by the partition plate, a valved discharge nozzle carried by the partition plate and communicating with the delivery chamber, gas supplying means for the aerating chamber, snifting means for said chambers, and means for controlling the snifting means and said gas supplying means.

10. In an apparatus for aerating liquids including the combination of a cylinder having aerating and delivery chambers, means for establishing communication between said chambers, said means comprising a tube, a liquid inlet located adjacent one end of the tube and a common valve for alternately controlling the liquid inlet and one end of said tube.

In testimony whereof I have affixed my signature hereto this 20th day of October 1922.

PERCIVAL ALBION GARRETT.